Nov. 15, 1955  A. SALNER  2,723,456
DEVICE FOR PERSPECTIVE DRAWING
Filed Aug. 13, 1951  3 Sheets-Sheet 1

*INVENTOR.*
Artur Salner
BY
ATTORNEY

Nov. 15, 1955    A. SALNER    2,723,456
DEVICE FOR PERSPECTIVE DRAWING
Filed Aug. 13, 1951    3 Sheets-Sheet 2

INVENTOR.
Artur Salner
BY
ATTORNEY

United States Patent Office 2,723,456
Patented Nov. 15, 1955

2,723,456

DEVICE FOR PERSPECTIVE DRAWING

Artur Salner, Prague, Czechoslovakia, assignor of one-half to Presna Mechanika, narodny podnik, Stara Tura, Czechoslovakia, a corporation of Czechoslovakia Application August 13, 1951, Serial No. 241,604

Claims priority, application Czechoslovakia September 7, 1950

3 Claims. (Cl. 33—77)

My invention relates to an apparatus for making perspective drawings of an object from existing horizontal and vertical orthogonal projections thereof, that is from a plan view and an elevational view of such object.

Apparatus of that type are known in the art. However, they are quite complicated in their construction, not easy to use and expensive in manufacture.

The object of my invention is to avoid the said disadvantages and to provide a drawing apparatus which is inexpensive in manufacture and may easily and reliably used even by inexperienced draftsmen.

The objects and features of my new drawing apparatus will be more fully understood from the following specification when read together with the accompanying drawing.

In the drawing

Figs. 1, 2 and 3 illustrate diagrammatically the theoretical principles on which my new apparatus is based. More particularly Fig. 1 shows in an axonometric view the relation between horizontal and vertical orthogonal projections of an object and its perspective view and indicates how such perspective view may be developed from the said orthogonal projections; Fig. 2 shows the said relations and the development of the drawing in a single drafting plane; and Fig. 3 illustrates still more fully the principles underlying my invention.

The same reference characters indicate the same parts or elements in all figures of the drawing.

Figure 1:
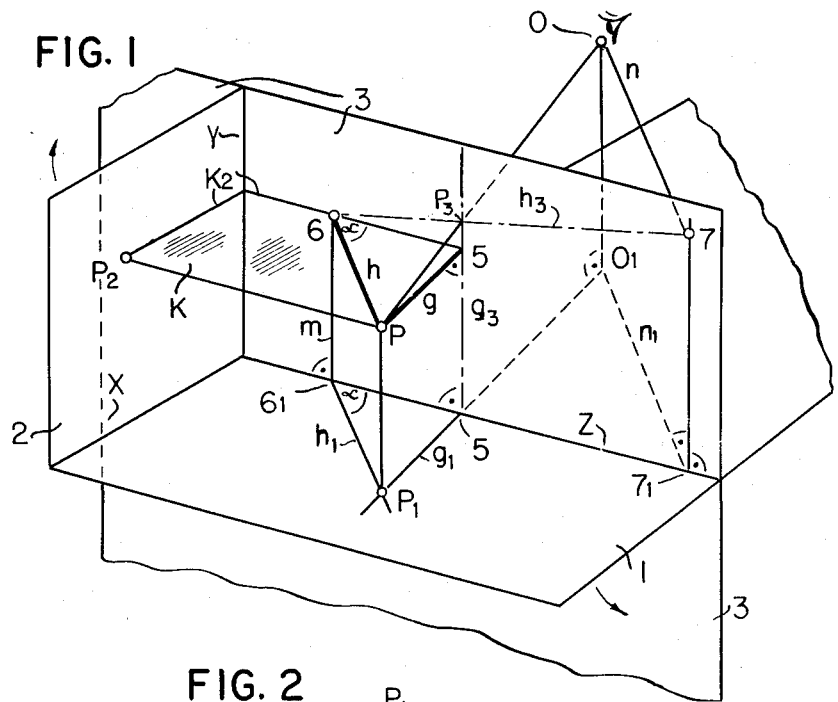

Fig. 1 illustrates in an axonometric view three mutually orthogonal planes with their respective lines of intersection or axes X, Y, and Z namely the horizontal plane 1 containing the plan view of an object, the vertical plane 2 containing the coordinated elevational view thereof and a second vertical plane 3 for drafting the perspective view of said object as seen, for example, from a point of observation O having its plan view at $O_1$, or horizontal projection. Now suppose we want to find from the given plan view $P_1$ and the given elevational view $P_2$ of a point P the perspective view $P_3$ thereof as seen from said observation point O. We place through point P a horizontal plane $k$ which will have its vertical projection $k_2$ on plane 2, and a vertical plane defined by the points P—$P_1$—O—$O_1$. The intersecting line $g$ of said two planes will contain point P and the horizontal projection $g_1$ of said line $g$ will connect the horizontal projection $P_1$ and $O_1$ of points P and O, respectively. The perspective view of line $g$ upon the drafting plane 3 will be the sectional line $g_3$ of said vertical plane containing points P and O with the plane 3, said line $g_3$ being vertical to axis Z in its intersecting point 5 with the horizontal projection $g_1$ of line $g$.

We draw thereafter another line $h$ within said horizontal plane $k$ through point P, said line $h$ including at its intersection point 6 with the vertical plane 2 an angle $\alpha$ therewith. The horizontal projection $h_1$ of said line $h$ will pass through $P_1$ and will include the same angle $\alpha$ with the axis Z at the intersection point $6_1$. The vertical projection of line $h$ will coincide with said line $k_2$. To find the perspective view of line $h$ upon the drafting plane 3 we imagine a line $n$ through observation point O parallel to line $h$. This line $n$ intersects plane 3 in point 7 and the connecting line $h_3$ between points 6 and 7 will represent the perspective view of line $h$ upon plane 3, the said point 7 being the vanishing point for the perspective views of all lines parallel to line $h$. The sectional point $P_3$ of the perspective views $g_3$ and $h_3$ is then the perspective view of point P in the drafting plane 3 as seen from the observation point O. In the same manner as described before the perspective view of any other point may be found.

In accordance with the principles described above with reference to Fig. 1, Fig. 2 illustrates the construction of a perspective view in a drafting plane 3, i. e. on drawing paper, into which the planes 1 and 2 have been revolved about their intersecting lines or axes Y and Z, respectively, as indicated by the arrows in Fig. 1. However, to facilitate the construction the location of the plane 1 containing the plan view and that of the plane 2 containing the elevational view is reversed relative to axis Z so that the given plan view appears above the axis Z and the given elevational view below said axis. Suppose $P_1$ and $P_2$ are the given plan view and elevational view, respectively, of a point P and $O_1$ is the plan view of an observation point O. As in Fig. 1 we connect $P_1$ and $O_1$ by the line $g_1$ which intersects axis Z at 5 and we also draw a line $h_1$ through $P_1$ under an angle $\alpha$ relative to axis Z up to the sectional point $6_1$.

Said angle $\alpha$ may be arbitrarily selected but has to remain the same in drafting the perspective views of all other points P located somewhere in space. The line $g_3$ constructed vertically to axis Z in said point 5 will represent the perspective view of line $g$ as defined above with respect to Fig. 1. As in Fig. 1 the perspective view $h_3$ of line $h$ will be the connecting line between point 6 and vanishing point 7. Point 6 is found as intersecting point of lines $m$ and $k_2$, $m$ being the vertical to axis Z in point $6_1$ and $k_2$ being a line through point $P_2$ parallel to axis Z. The vanishing point 7 is located upon the vertical line drawn in point $7_1$ which is the intersecting point of the line $n_1$ drawn parallel to line $h_1$ through the plan view $O_1$ of the observation point O, and said point 7 is selected upon said vertical line at a distance 7—$7_1$ which is equal to the desired elevation of the observation point O above the horizontal plane 1 as illustrated in Fig. 1. Having now constructed the perspective views $g_3$ and $h_3$ of lines $g$ and $h$, respectively, the perspective view $P_3$ of point P will be the sectional point of lines $g_3$ and $h_3$. In the same manner the perspective views of other spatial points may be constructed and if properly connected used for showing the perspective view of any configuration of which they are a part.

Figure 2:
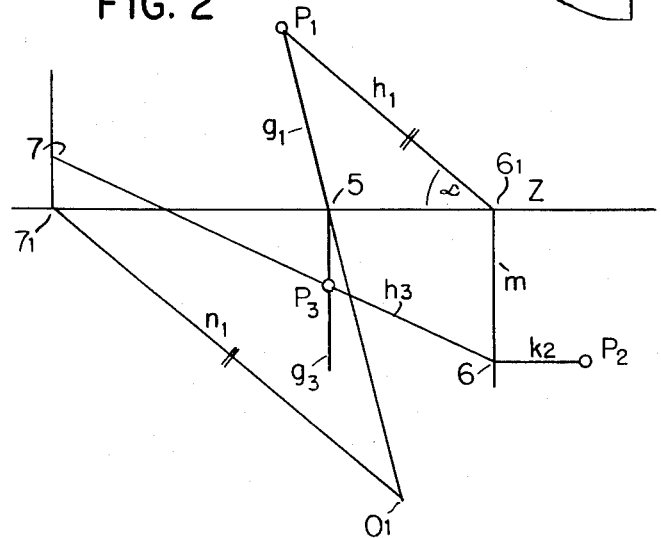
Figure 3:
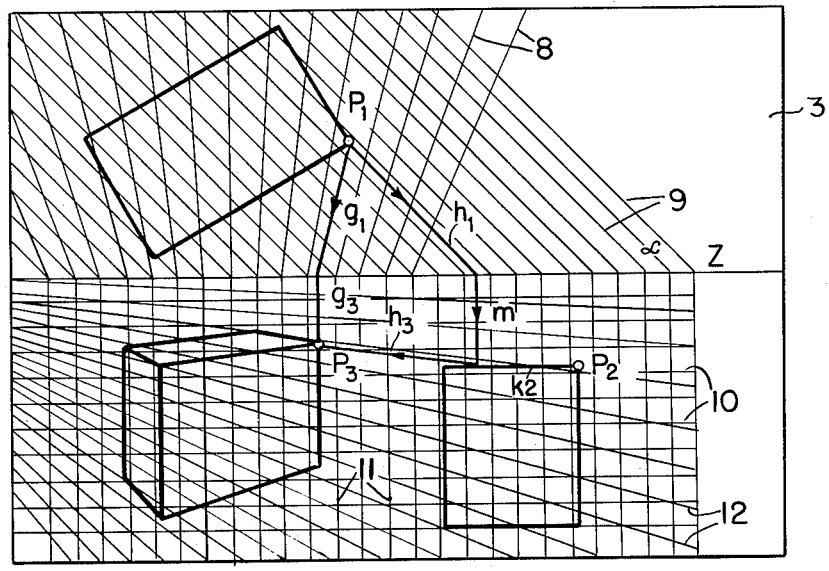

Having described with reference to Figs. 1 and 2 the principles underlying my invention I wish now to describe in more detail with reference to Fig. 3 the application of said principles. Bearing in mind that the same reference characters indicate the same elements in all figures of the drawing, Fig. 3 illustrates drawing board or sheet of drawing paper 3 showing an axis Z. Above said axis are arranged a plurality of lines 8 converging in the horizontal projection $O_1$ of observation point O which is outside said paper, and a plurality of parallel lines 9 which include an angle $\alpha$ with said axis. Said lines 8 and 9 conform to and represent the lines $g_1$ and $h_1$, respectively, as defined above with reference to Figs. 1 and 2. Below said axis Z is arranged a plurality of lines 10 parallel to axis Z, a plurality of lines 12 converging in vanishing point 7 which lies outside the drawing board, and a plurality of lines 11 which are vertical to axis Z. Said lines 10, 11 and 12 represent lines $k_2$, $h_3$ and $f_3$, respectively, as defined above with reference to Figs. 1 and 2. Suppose we want to draw the perspective picture of a cube from a given plan and elevational view thereof. The plan view is placed above axis Z and the elevational view below said axis as explained with reference to Fig. 2. The perspective view of the corners of said cube are constructed as shown with reference to corner P having its horizontal projection at $P_1$ and its vertical projection at $P_2$. Following the same procedure as described above with reference to Fig. 2 we follow within the system of lines 8 the line marked $g_1$ from point $P_1$ and from the intersecting point of said line $g_1$ with axis Z we follow along a vertical line $g_3$ within the system of lines 11. Thereafter we follow the line $h_1$ within the system of lines 9 from point $P_1$ up to axis Z, and at the intersecting point we follow the vertical line $m$ within the system of lines 10 up to the horizontal line $k_2$ passing through point $P_2$ within the system of lines 10. The line $h_3$ within the system of lines 12 intersects line $g_3$ in point $P_3$ which is the perspective view of cube corner P. The perspective views of the other cube corners are constructed in the same manner and when properly connected will show the perspective picture of the cube.

Figure 4:
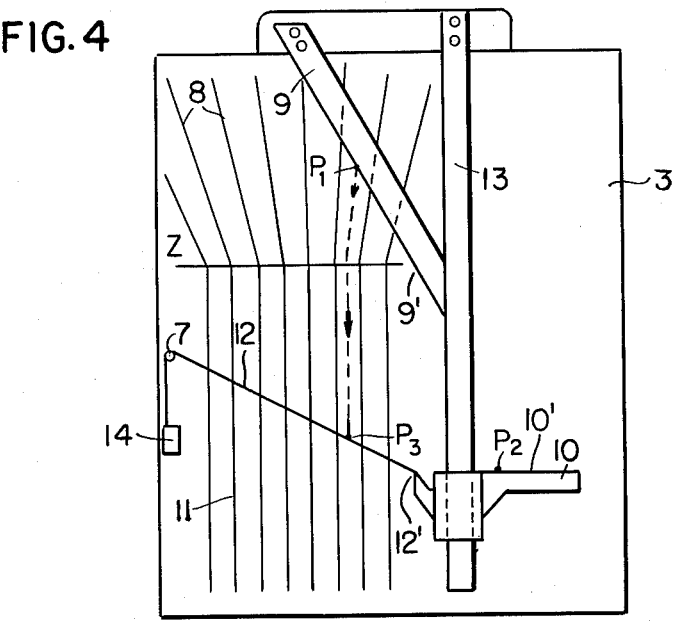
Fig. 4 shows in a top view an embodiment of my new drawing apparatus.

Fig. 4 shows a drawing board 3 in combination with which an apparatus constructed and operating on the principles described above may be used. The apparatus comprises a ledgelike guide member 13, such as a T-square placed or mounted upon the drawing board for parallel displacement perpendicular to its longitudinal axis. The drawing board shows an axis Z and a system of lines 8 and 11 representing the lines $g_1$ and $g_3$ as defined with respect to Fig. 3. Secured to said guide member 13 is a ruler 9 having an oblique tracing edge 9' which represents the lines 9 or $h_1$ of Fig. 3. Said guide member 13 is further provided with a second ruler 10 slidably mounted thereupon and provided with a tracing edge 10' which is perpendicular to the longitudinal axis of said guide member 13 and which represents the lines 10 or $k_2$ of Fig. 3. Further, at a point 12' which is in alignment with the tracing edge 10' a thread 12 is attached to said ruler 10, said thread being led over a support 7, such as a pin or pulley and held in stretched position by a weight 14 or by other suitable means such as a spring loaded reel. It will be well understood that the location of the support 7 corresponds to the location of the vanishing point in which the lines 12 of Fig. 3 converge. The apparatus is operated in the following manner: Suppose the plan view $P_1$ and the elevational view $P_2$ of a point P are given and it is desired to find the perspective view $P_3$ thereof. First, the guide member 13 is displaced parallel to its longitudinal axis until the tracing edge 9' of ruler 9 passes through the point $P_1$. Thereupon the ruler 10 is displaced along the guide member 13 until its tracing edge 10' passes through point $P_2$. In these positions of rulers 9 and 10 the stretched thread 12 will indicate the position of the particular line 12 or $h_3$ as shown in Fig. 3 upon which the perspective view $P_3$ will be located. To find the exact position thereof a line 8, or $g_1$, as defined above is followed from point $P_1$ up to its intersection with axis Z and from there a line 11, or $g_3$, which is perpendicular to axis Z up to the intersection point with the thread 12 which point will be the desired perspective view $P_3$.

Figure 5:
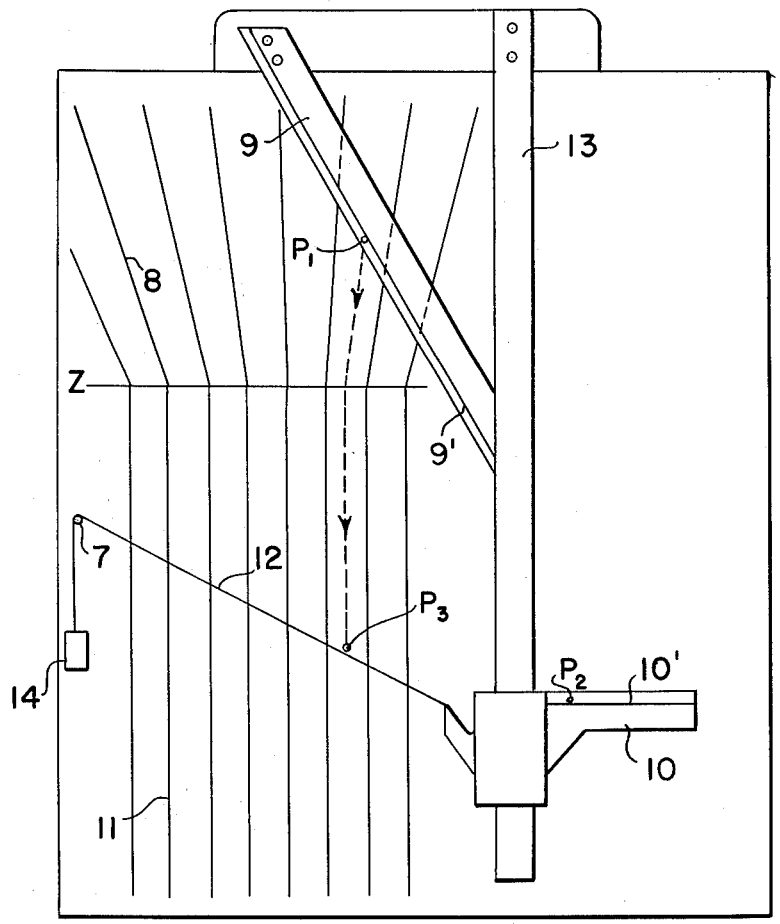
Fig. 5 shows in a top view a modified embodiment thereof.

The rulers 9 and 10 may be made from transparent material and provided with engraved tracing lines 9' and 10', respectively, as illustrated in Fig. 5.

While two specific embodiments of my invention have been shown and described in detail to illustrate the application of the principles of my invention, it will be well understood that the same may be otherwise embodied without departing from such principles and without avoiding the scope of the appended claims. Thus, for example, the thread 12 shown in Figs. 4 and 5 may be replaced by a ruler which is at or near one end rotatably mounted upon the drawing board at the vanishing point 7 and which with its other end rests slidably in a supporting guide member rotatably mounted on ruler 10.

What I claim as my invention is:

1. In an apparatus for making perspective drawings of an object from a horizontal and a vertical orthogonal projection thereof, the combination comprising a ledgelike guide member mounted for parallel displacement perpendicular to its longitudinal axis, a first ruler with an oblique tracing edge attached to said guide member for displacement therewith to cooperate with the horizontal orthogonal projection, a second ruler with a tracing edge perpendicular to the longitudinal axis of said guide member, said second ruler mounted upon said member for parallel displacement thereupon to cooperate with the vertical orthogonal projection, a thread attached with one end to said second ruler and extending across the drawing field, a suspender for slidable support of said thread directing the same to the selected vanishing point, and means to maintain said thread in stretched position.

2. In an apparatus for making perspective drawings of an object from a horizontal and a vertical orthogonal projection thereof, the combination comprising a drawing board, means of defining a field of radial lines converging at a given point of view, on which field the horizontal orthogonal projection may be superposed, an adjoining drawing field laterally to which the conforming vertical orthogonal projection of said object may be placed, said drawing field provided with parallel straight lines perpendicular to the picture plane line separating said field, said parallel straight lines representing the perspective projections of said radial lines, a ledgelike guide member having its longitudinal axis parallel to said straight lines in the drawing field and mounted for parallel displacement perpendicular thereto, a first ruler with an oblique tracing edge attached to said guide member for displacement therewith above the field of radial lines, said tracing edge to cooperate with the horizontal orthogonal projection in said field of radial lines, a second ruler with a tracing edge perpendicular to the longitudinal axis of said guide members, said second ruler cooperating with said vertical orthogonal projection and mounted upon said guide member for parallel displacement thereupon, a thread attached with one end to said second ruler to extend across the drawing field, a suspender for slidable support of said thread mounted upon the drawing board at the selected vanishing point, and means to maintain said thread in stretched position.

3. An apparatus according to claim 2 wherein at least one of the two rulers is made from transparent material and is provided with a straight tracing mark replacing the tracing edge.

References Cited in the file of this patent

UNITED STATES PATENTS

| | | |
|---|---|---|
| 1,657,301 | De Postels | Jan. 24, 1928 |
| 1,964,197 | Edison | June 26, 1934 |
| 1,964,198 | Edison | June 26, 1934 |
| 1,990,040 | Launay | Feb. 5, 1935 |